3,795,653
LIGHTWEIGHT CONCRETE AND METHOD OF MANUFACTURING IT

Alois Aignesberger and Hans Günter Rosenbauer, Trostberg, Germany, assignors to Suddeutsche Kalkstickstoff-Werke Aktiengesellschaft, Trostberg, Germany
No Drawing. Filed Sept. 17, 1971, Ser. No. 181,617
Claims priority, application Germany, Oct. 7, 1970, P 20 49 159.2
Int. Cl. C04f 13/26, 13/28; C08g 9/22
U.S. Cl. 260—39 SB          5 Claims

ABSTRACT OF THE DISCLOSURE

Lightweight concrete is prepared by premixing and coating lightweight filler particles with a melamine formaldehyde condensation product containing sulfonic acid groups and thereafter admixed with cement.

---

The present invention relates to a lightweight concrete and a method of manufacturing it.

It is already known to use adherence promoters and synthetic resin adhesives based on polyepoxide compounds or polyvinyl polymers for the pretreatment of Styropor particles for the manufacture of lightweight concrete. An improvement in the processing and strength properties can be obtained in particular upon the joint use of epoxy resins together with suitable hardeners, but the values obtained do not in all cases satisfy practical requirements.

The quality of lightweight concrete can be improved by either an increase in strength for the same density or maintaining the same strength values with a reduction in density.

Such improvements are obtainable in accordance with this invention by pretreating the lightweight filler particles before their admixture with the cement, and possibly other additives, with a 0.2 to 20% aqueous solution of a melamine formaldehyde condensation product which contains sulfonic acid groups and has a viscosity of 8–180 cp. in a 20% by weight solids aqueous solution.

The resulting lightweight concrete has improved properties and is characterized by the fact that it contains lightweight filler particles that are coated with a melamine formaldehyde condensation product containing sulfonic acid groups.

The pretreatment can be effected, for instance, by spraying the lightweight filler particles, e.g., expanded clay, polystyrene, perlite, vermiculite, pumice, slag, and the like, or a combination thereof, with an aqueous solution of the condensation product, by dipping or immersing the lightweight filler particles into the solution, or by a uniform mixing thereof in a positive-type mixer. When spraying or dipping, care should be taken to obtain a uniform coating or distribution of the condensation product on the lightweight filler particles. In a positive-type mixer, mixing is generally complete after a residence time of 30 to 200 seconds.

The melamine formaldehyde condensation products containing sulfonic acid groups which are used in accordance with the invention are available on the market as an aqueous solution or solid under the trade name Melment. A method of preparing these products is described, e.g., in Austrian Pat. 263,607.

It is essential that the aqueous solution of the melamine formaldehyde condensation product containing sulfonic acid groups be added to and admixed with the lightweight filler particles before the latter come into contact with the cement. A simultaneous mixing of all components necessary for the production of lightweight cement does not lead to success.

In accordance with the invention, both the bond between the lightweight filler particles and the cement, and the compressive and flexural tensile strengths of the lightweight concrete obtained are improved.

EXAMPLE 1

27.2 parts by weight of expanded clay were premixed for thirty seconds with 6.63 parts by weight of an aqueous solution containing 1.18% by weight of a melamine formaldehyde condensation product containing sulfonic acid groups having a viscosity of 11 cp. in 20% aqueous solution, whereupon 7.8 parts by weight of portland cement 375 * were added with stirring, and mixing was effected for an additional ninety seconds.

A comparative batch was produced without the melamine condensation product containing sulfonic acid groups.

Test cubes having an edge length of 20 cm. were made of each lightweight concrete mix and tested for density and compressive strength after one day. The results were:

|  | Density, kg./dm.³ | Compressive strength, kg./cm.² |
|---|---|---|
| Without additive | 1.44 | 81 |
| With additive | 1.44 | 135 |

EXAMPLE 2

27.2 parts by weight of expanded clay were premixed for thirty seconds with 6.50 parts by weight of an aqueous solution containing 0.6% by weight melamine formaldehyde condensation product containing sulfonic acid groups having a viscosity of 11 cp. in 20% aqueous solution, whereupon 7.8 parts by weight of portland cement 375 * were added with stirring and mixing was continued for an additional 90 seconds.

A comparative batch was produced without the melamine formaldehyde condensation product containing sulfonic acid groups.

Test cubes having a side length of 20 cm. were prepared from each lightweight concrete mix and tested for density and compressive strength after one and 28 days. The results were:

|  | Density, kg./dm.³, after— | | Compressive strength kg./cm.², after— | |
|---|---|---|---|---|
|  | 1 day | 28 days | 1 day | 28 days |
| Without additive | 1.73 | 1.67 | 57 | 493 |
| With additive | 1.73 | 1.67 | 93 | 575 |

EXAMPLE 3

950 parts by volume of prefoamed polystyrene (bulk weight 12 g./liter) were premixed for two minutes with 204 parts by weight of an aqueous solution containing 0.98% by weight melamine formaldehyde condensation product containing sulfonic acid groups having a viscosity of 11 cp. in 20% aqueous solution, whereupon 400 parts by weight of portland cement 275 and 435 parts by weight of quartz sand of a grit of 0–0.3 mm. were added with stirring, whereupon mixing was continued for another minute.

Comparative batches were produced without the melamine-formaldehyde condensation product and with a commercially epoxide coated polystyrene.

Bricks having dimensions of 4 x 4 x 16 cm. were prepared from each batch and tested after one day for density

---

*A portland cement which reaches a minimum compressive strength of 375 kg./cm.² under the conditions specified in DIN 1164–E, 1967.

and flexural tensile and compressive strengths. The results were:

|  | Weight per unit volume, kg./dm.³ | Flexural tensile strength, kg./cm.² | Compressive strength, kg./cm.² |
| --- | --- | --- | --- |
| Without additive | 1.05 | 7 | 20 |
| With additive | 1.05 | 15 | 45 |
| With epoxide coated polystyrene | 1.05 | 10 | 29 |

What is claimed is:

1. Lightweight concrete essentially comprising cement and particles of a lightweight filler wherein said particles are pre-coated with a melamine formaldehyde condensation product containing sulfonic acid groups, said condensation product having a viscosity of 8–180 cp. in an aqueous 20% solids solution.

2. Lightweight concrete as defined in claim 1 wherein the lightweight filler particles are expanded clay, polystyrene, perlite, vermiculite, pumice, slag, or a combination thereof.

3. Method of producing lightweight concrete essentially comprising cement and particles of a lightweight filler, wherein the lightweight filler particles are pretreated with a 0.2–20% aqueous solution of a melamine formaldehyde condensation product containing sulfonic acid groups having a viscosity of 8–180 cp. in an aqueous 20% solids solution, and admixed with cement.

4. Method as defined in claim 3, wherein the lightweight filler particles are premixed with the aqueaus solution of the condensation product for 30 to 200 seconds.

5. Method as defined in claim 3, wherein the lightweight filler particles are expanded clay, polystyrene, perlite, vermiculite, pumice, slag, or a combination, thereof.

References Cited

UNITED STATES PATENTS

| 3,257,338 | 6/1966 | Sefton | 264—Dig. 7 |
| 3,021,291 | 2/1962 | Thiessen | 264—Dig. 7 |
| 3,251,916 | 5/1966 | Newnham et al. | 264—Dig. 7 |
| 3,640,787 | 2/1972 | Heller | 264—Dig. 7 |
| 2,806,509 | 9/1957 | Bozzacco et al. | 264—Dig. 7 |

PHILIP E. ANDERSON, Primary Examiner

U.S. Cl. X.R.

260—2.5 B; 264—Dig. 7